United States Patent [19]
Hill et al.

[11] Patent Number: 5,628,195
[45] Date of Patent: May 13, 1997

[54] VIBRATIONALLY ISOLATED THERMAL SYSTEM FOR A CRYOGENICALLY COOLED DEVICE

[75] Inventors: Dennis Hill, Pottstown; Ralph C. Longsworth, Allentown, both of Pa.

[73] Assignee: APD Cryogenics, Inc., Allentown, Pa.

[21] Appl. No.: 396,528

[22] Filed: Mar. 1, 1995

[51] Int. Cl.$^6$ .................................................. F25B 19/00
[52] U.S. Cl. ............................. 62/51.1; 62/295; 62/297
[58] Field of Search ........................ 62/51.1, 295, 297

[56] References Cited

U.S. PATENT DOCUMENTS

| | | | |
|---|---|---|---|
| 4,352,643 | 10/1982 | Iijima | 62/297 |
| 4,745,761 | 5/1988 | Bazaj et al. | 62/295 |
| 5,363,077 | 11/1994 | Herd et al. | 62/51.1 |

Primary Examiner—Ronald C. Capossela
Attorney, Agent, or Firm—Helfgott & Karas, P.C.

[57] ABSTRACT

A cryogenic cold head in a canister is partially surrounded by an isolation mass. An open portion of the mass permits access for connection of a vapor compression refrigeration unit to the cold head, which is highly conductive. Straps of braided copper suspend the isolation mass from the cold head. The isolation mass and straps have a fundamental frequency that is below the first harmonic frequency at the cold head as caused by the refrigeration unit. A temperature differential between the cold head and a device-mounting interface on the isolation mass is preferably less than 2.5K per watt of heat transferred. The device to be cooled is mounted directly to the isolation mass when the mass of the device is insignificant relative to the isolation mass. For further vibration isolation, the device is separated from the isolation mass by another braided strap. By mounting the isolation mass using a plurality of generally opposed braided straps, any orientation of the cold head/isolation mass combination may be used without jeopardizing performance.

24 Claims, 4 Drawing Sheets

VIBRATIONALLY ISOLATED THERMAL SYSTEM FOR A CRYOGENICALLY COOLED DEVICE

BACKGROUND OF THE INVENTION

This invention relates generally to cooling a device, for example, a detector, at cryogenic temperatures in a vacuum canister, and more particularly to cooling and protecting a vibrationally sensitive device in a canister at cryogenic temperatures.

A variety of electronic detectors sample electromagnetic waves, for example, x-rays, gamma rays, and infrared radiation, or monitor changes in magnetic fields, for example, superconducting quantum interface devices referred to as SQUIDS. The sensitivities of these detectors can often be greatly enhanced by cooling the detectors to cryogenic temperatures that are generally less than 150 K. Further, the absolute positions of the detector and other equipment in close proximity to the detector must remain fixed in order to minimize detector signal noise errors caused by the slightest motion. Thus, the device which cools the detector must not impose high levels of vibration that would render the detector useless.

In the prior art, a very cold head, a heat absorber, is positioned in an evacuated canister to effect the actual cooling of a detector. Such cooling is frequently accomplished by having a flexible strap, which is also a good thermal conductor, connected between the cold head and the detector. Heat from the detector readily flows to the cold head because of the high conductivity of the strap, and at the same time vibrations generated in the cold head are partially isolated from the detector by the flexibility of the strap connector, e.g., braided copper, between the cold head and the detector.

A desired low temperature for the cold head can be obtained by boil-off of a cryogenic refrigerant, such as liquid nitrogen, in the cold head or in a system closely connected to the cold head. The liquid nitrogen turns to gas as it absorbs heat and the gas is vented. Temperatures in the order of 77 K are provided. However, the boiling action of the liquid nitrogen itself creates vibrations, and thus frequently necessitates an isolation system.

Also, for cryogenic cooling of devices requiring maintenance at such low temperatures refrigerating units of the vapor compression type are frequently utilized. Such systems tend to cause considerable vibration in the cold head to which a device to be cooled, for example, a detector, is directly or indirectly connected. Therefore, these closed cycles have not provided a practical approach where vibration sensitivity is critical.

Historically, braided copper connecting straps have been used to effectively transfer heat from a cooled device where vibration is an important parameter. The straps also provide a flexible linkage between the cold head and the detector that reduces the level of vibration which is imposed on the detector. When the mass of the cooled device is small so that inertial forces are negligible, as is frequently the case with a detector, the vibration level at the detector has a value approximately given by the cold head vibration reduced by the ratio of the stiffness of an interconnecting strap to the stiffness of a support for the detector.

The actual equation is:

$$\delta_2 = \frac{R_1 \delta_1}{R_1 + R_2}$$

where $\delta_1$=cold end motion; $\delta_2$=detector motion; R1=strap stiffness and R2=support stiffness. When R2>>R1 for good isolation then $$\delta_2 \approx \frac{R_1}{R_2} \delta_1$$

For example, in order to reduce vibration at the detector by a factor of 25 over the vibration level of the cold head, the detector support must be approximately 25 times stiffer than the connecting strap. Such a construction requires a stiff detector support structure, which may lead to unacceptable parasitic heat losses through the structure, and requires a very flexible connecting strap which may lead to low heat transfer efficiency.

Tests have indicated that many vibration-sensitive detectors that operate best at cryogenic temperatures require vibration levels that are less than 0.002 overall grms (where g is the force of gravity) in three axes. In a system wherein the only significant vibration source was the boiling of liquid nitrogen, that is, a system without a vapor compression cycle, the vibration level was found to be marginal at 0.002 grms overall. Thus, to reduce the vibration at the detector, a braided copper strap was used to connect between a cold head of the refrigeration system and the detector, which was supported in a canister. The cold head made contact with the boiling liquid nitrogen.

With this construction, it was possible to reduce the vibration levels at the detector below the 0.002 g level, as required. However, a refrigerant boil-off system presents problems of replacement of exhausted refrigerant supplies, venting of evaporated refrigerant, etc. Thus, it is generally desirable in cryogenic refrigeration systems to rely on a closed cycle vapor compression refrigeration unit when such is available to meet the temperature and heat load requirements.

A closed cycle cooling system, which thermodynamically meets the temperature and load requirements for a detector as was used in the test described above, introduced vibration levels at the cold head which were 10 to 25 times higher than the vibration levels produced by boil-off of liquid nitrogen. To be able to substitute such a vapor compression apparatus, the detector support would require modification to make it 25 times stiffer than the structure required when using the liquid nitrogen boil off system.

Such a detector support construction was impractical to accomplish for use in a typical sensor or detector application. Reducing the stiffness of the interconnecting braided straps was also unacceptable in that thermal problems were induced. A closed cycle refrigeration system for cryogenic temperatures, which was used in this evaluation, is of the type described in U.S. Pat. No. 5,337,572, issued Aug. 15, 1994, and having the same assignee as the present application. This patent is incorporated herein by reference.

What is needed is an improved vibrationally isolated thermal system that may use a closed cycle vapor compression refrigeration unit to cool devices, which operate at cryogenic temperatures and are extremely sensitive to vibrations.

SUMMARY OF THE INVENTION

Accordingly, it is an object of the invention to provide an improved vibrationally isolated thermal system for a cryogenically cooled device having performance characteristics dependent upon freedom from vibration forces.

A further object of the invention is to provide an improved vibrationally isolated thermal system for a cryogenically cooled device that uses a closed cycle vapor compression unit for refrigeration.

Still another object of the invention is to provide an improved vibrationally isolated thermal system for a cryogenically cooled device that can operate effectively at any orientation.

Yet another object of the invention is to provide an improved vibrationally isolated thermal system for a cryogenically cooled device that can replace other refrigeration units without affecting the mounting for the cooled device.

In a vibrationally isolated thermal system for a cryogenically cooled device, in accordance with the invention, a cold head, which is part of or connected to a vapor compression cycle refrigeration unit, is at least partially surrounded by an isolation mass. An open portion of the mass permits access for a highly conductive connection of the refrigeration unit to the cold head. Straps of braided copper suspend the isolation mass from the cold head. Thus, the isolation mass, which is also of a highly conductive thermal material, for example, copper, will, under no-load conditions cool down to substantially the same temperature as the cold head.

When heat is input to the isolation mass from the device to be cooled, then a temperature gradient will exist between the isolation mass and the cold head. The temperature differential is proportionate to the amount of heat which is transferred and the resistance of the thermal path between the isolation mass and the cold head by way of the conductive straps. The isolation mass and straps are sized to have a fundamental frequency that is below the first harmonic frequency at the cold head as caused by the refrigeration unit. The straps are also dimensioned to provide a temperature differential between the cold head and a device-mounting interface on the isolation mass of less than 2.5 K per watt of heat transferred. In some applications where vibration isolation is more important, and operation temperature is less critical, up to 50 K per watt may be acceptable.

The device to be cooled, for example, a detector, can be mounted directly to the isolation mass, when the mass of the detector or device is insignificant relative to the isolation mass. The detector may be a part of or housed within the isolation mass. When further vibration isolation is required, the device to be cooled can be separated from the isolation mass by another braided strap of highly conductive material.

By mounting the cold head within a hollow cavity of the isolation mass using at least two generally opposed braided straps, any orientation of the cold head/isolation mass combination may be used without jeopardizing performance, so long as the cold head and isolation mass do not come into direct physical contact.

In another embodiment in accordance with the invention, the cold head may be configured to partially surround the isolation mass, with opposed conductive straps between the isolation mass and cold head maintaining the relative positions and providing vibration isolation and heat transfer, as above.

The invention accordingly comprises the features of construction, combination of elements and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which:

FIG. 1b is an equivalent vibrational representation of the system of FIG. 1a;

FIG. 2b is an equivalent vibrational representation of the system of FIG. 2a;

FIG. 3a is similar to FIG. 2a and represents an alternative embodiment of a vibrationally isolated thermal system in accordance with the invention; and FIG. 3b is a representation similar to FIG. 2b for the embodiment of FIG. 3a;

FIG. 6b is a perspective view of a strap assembly as in FIG. 6a.

DESCRIPTION OF PREFERRED EMBODIMENTS

Figure 1A:
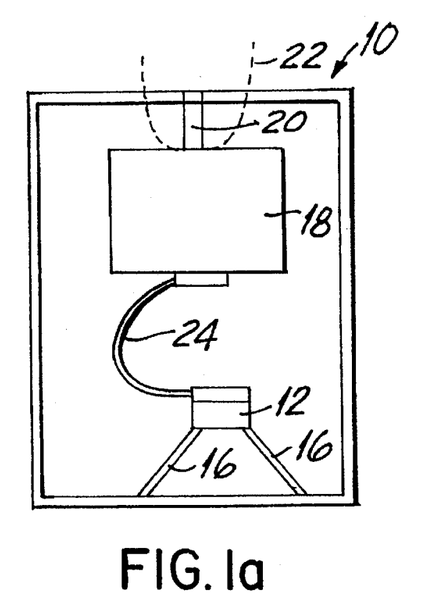
FIG. 1a schematically represents system of the prior art for cooling and vibrationally isolating a device in a canister.
Figure 1B:
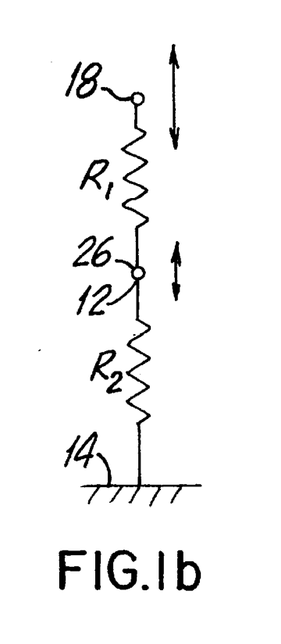

With reference to FIGS. 1a and 1b, a vibrationally isolated thermal system 10 of the prior art includes a device, for example, a detector 12, which is enclosed by an evacuated canister 14, which is generally at room temperature. Support elements 16 hold the detector 12 away from the walls of the canister 14. A cold head 18 is suspended within the canister 14, being supported by a structural element 20, and cooled by refrigeration means 22, indicated only by broken lines in FIG. 1a.

The refrigeration means 22 can be of any type that will produce temperatures lower than the desired temperature for the detector 12. However, as discussed above, it is desirable that the refrigeration means 22 impart low vibrational energy to the cold head 18 to the extent that this is possible. Generally, the cold head 18 is the coldest portion of the refrigeration means 22.

When the refrigeration means 22 includes a closed cycle vapor compression cycle, high pressure refrigerant expands as its pressure is reduced while flowing through an orifice or capillary tube, whereby the temperature of the refrigerant is reduced in accordance with the known Joule-Thomson effect. The cold refrigerant cools the cold head 18 and absorbs heat therefrom. The now-heated refrigerant returns to a compressor device (not shown) where it is pressurized; the heat in the refrigerant is then rejected to the external ambient, and the refrigerant is recirculated.

On the other hand, where the refrigeration means 22 operates on an open cycle wherein a refrigerant is boiled at ambient or at a controlled throttle pressure, the chamber (not shown) wherein the refrigerant boils is connected to or is part of the cold head 18 so that cooling is provided for the detector.

A flexible, thermally highly conductive strap 24 connects between the cold head 18 and the detector 12 such that heat generated or absorbed by the detector 12 flows through the strap 24 to the cold head 18 and then into the refrigerant of the refrigeration means 22.

However, joining of the cold head 18 to the detector 12 by means of the flexible strap 24 allows transmission of vibrational energy from the cold head 18 to the detector 12. As stated, many detectors are intolerant even to very low levels of vibration and cannot perform usefully. Therefore, a conflict arises in selecting the proper strap 24.

Obviously, if no strap is used, the vibrational transmission is minimized. Unfortunately, in such a construction heat transfer is very greatly reduced as only radiation and the structure 16 would remain for heat transfer in the canister. The heat transfer coefficient for radiation is much much lower than the heat transfer coefficient when using a conduction path such as the flexible strap. Also, the elements 16 would carry heat to the detector 12. Further, a much larger temperature difference between the detector 12 and the cold head 18 is required when non-conductive heat transfer mechanisms are used. Clearly, complete elimination of the strap is impractical as a solution to vibration problems.

A reduction in the temperature differential between the detector 12 and cold head 18 can be effected by using straps in parallel, thicker straps, shorter straps, etc. However, such changes in the straps will tend to increase the vibrational energy that is imparted by the cold head 18 to the detector 12.

FIG 1b is an equivalent representation of the vibrational structure inherent in FIG. 1a. The stiffness or spring resistance of the flexible strap 24 is represented by the resistance R1, and the combined resistance of the support elements 16 for the detector is represented by the resistance element R2. The two resistances are in series with the detector 12, which is located at the node 26 between them.

Making an assumption that the mass of a detector 12 is small so that its inertial forces are negligible, as is typically the case, the vibration level at the detector 12 is approximately that imparted by the cold head vibration reduced by the ratio of the stiffness R1 of the interconnecting strap 24 to the stiffness R2 of the detector support elements 16.

For example, in order to reduce vibration at the detector 12 by a factor of 25 over that of the cold head 18, the detector support 16 must be roughly 25 times stiffer than the connecting strap 24. This construction requires a stiff detector support structure 16, which may lead to unacceptable parasitic heat losses, and requires a very flexible connecting strap, which may lead to unacceptably high heat transfer temperature differentials.

This prior art approach relies on the stiffness of the flexible connecting strap 24 and the stiffness of the detector support structure 16. While such a system has proven effective in actual use where the refrigeration means 22 is an open cycle refrigerant boiling system (without a compressor), this concept is not suitable for use with a closed cycle vapor compression system of known types, when the device to be cooled is extremely sensitive to vibration levels.

Figure 2A:
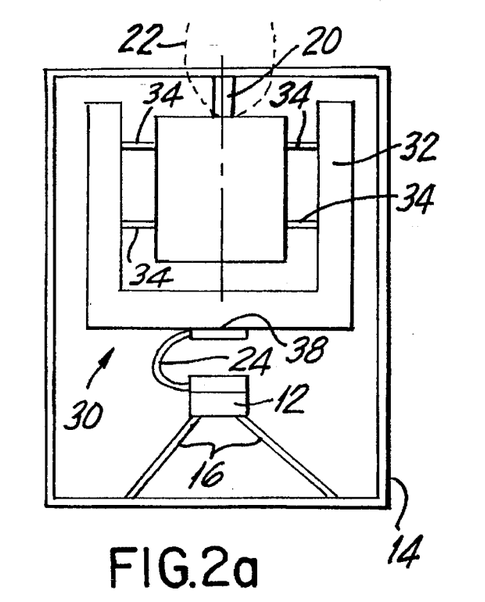
FIG. 2a schematically represents a system, in accordance with the invention, for cryogenically cooling and mechanically isolating a device in a canister.

FIG. 2a is an embodiment of a vibrationally isolated thermal system 30 in accordance with the invention wherein similar components are given the same reference numerals as in the embodiment of FIGS. 1a, b. In the system 30, which provides mechanical isolation for the cryogenically cooled device 12, an isolation mass 32 is vibrationally positioned between the cold head 18 and the detector 12. The detector 12 is supported by structural elements 16 to the base of the vacuum canister 14.

A plurality of straps 34 of highly flexible construction and of excellent thermal conductivity, such as braided copper straps, connects between the cold head 18 and the isolation mass 32. The isolation mass 32 is suspended from the cold head 18 by the straps 34, and in this embodiment has no other support. Although the straps 34 are highly flexible, their opposed positions of attachment between the isolation mass 32 and the cold head 18 prevent the isolation mass 32 from moving from a position generally centered about a longitudinal axis 36, regardless of the orientation of that axis 36 relative to a true vertical position. Thus, the isolation mass 32 is constrained to the cold head 18, having somewhat more freedom for relative motion in the axial direction than in the radial direction. A structural element 20 holds the cold head 18 in position within the canister 14.

A flexible highly thermally conductive strap 24, as above, connects between the detector 12 and an interface of the isolation mass 32. The locus 38 of connection is generally on the longitudinal end of the isolation mass 32, that is, away from the attachment points of the radially oriented straps 34.

Figure 2B:
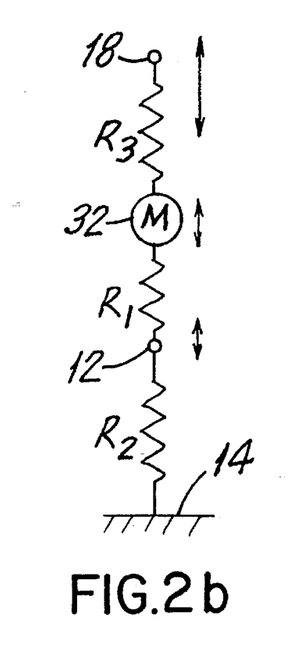

As illustrated in the equivalent diagram of FIG. 2b, the system in accordance with the invention includes the mass 32 and a third series resistance R3 representing the stiffness of the straps 34 extended between the cold head 18 and the mass 12. Resistances R1, R2 are as described above. The system 30 in accordance with the invention, thereby provides three resistances in series with the detector 12 and the isolation mass 32.

In the system 30 of FIGS. 2a, b, motion of the isolation mass 32 is greatly reduced from that of the cold head 18 by the straps 34. Then, further reduction in vibration between the isolation mass 32 and the detector 12 is achieved in the conventional manner by the relationship of the stiffness of the flexible connecting strap 24 and the stiffness of the detector support structure 16.

The detector 12, support elements 16 and strap 24 are the same as in the embodiments of FIGS. 1a and 1b. Thus, the system 30 using an isolation mass 32 can be used to replace the cold head 18/strap 24 system 10 of FIG. 1a without any change in the detector 12 or in its mounting 16. By proper sizing of the isolation mass 32, a system 30 in accordance with the invention (FIG. 2a), and using a closed vapor compression cycle imparts no more vibrational energy to the detector 12 than the system of FIG. 1a operating on an open cycle with boiling refrigerant. An important difference between the two systems is that the vibration level at the isolation mass 32 where the strap 24 is attached (38) is greatly reduced from that where the flexible strap 24 is connected directly (FIG. 1a) to the cold head 18.

The system 30 achieves a high degree of vibration reduction by making use of the inertia of the isolation mass 32 in resisting motion, and may be considered a classical isolator in this sense. The mass 32 vibrates less than the cold head 18 when the natural frequency of the mass 32/copper braid 34 combination is less than 0.707 times the frequency of the driving force, which in this case is the cold head vibration frequency. Thus, for example, if a cold head vibration shows a first harmonic at 60 Hz with a large contribution from higher harmonics at 120 Hz and 180 Hz, and including significant frequency content through 4000 Hz, the isolation system 30, in accordance with the invention, will achieve some degree of attentuation when the fundamental frequency of the aforementioned mass/strap combination is less than 42 Hz (0.707×60 Hz).

An analytically designed isolation system with a calculated fundamental frequency below 20 Hz was expected to provide vibration reductions on the order of 10 to 25. Known coolers of the Sterling type produce a first harmonic in the order of 50 Hz to 60 Hz. An isolator system 30 of calculated design for use with a Sterling type refrigeration unit 22 was found to be effective in producing vibration reductions on the order of 10 to 25 to 1.

In calculating and constructing such an isolation system, an acceptable temperature gradient between the cold head 18 and the detector 12 was an important design parameter. Although no particular limits can be set, a temperature rise between the cold head 18 and the detector interface 38 on the isolation mass 32 of 2.5 K per watt of heat transfer, was considered to be desirable for a particular application. The limiting heat flow path in the system of FIG. 2a is the strap 24 as all of the heat from the detector is intended to flow through that strap.

Figures 3A, 3B:
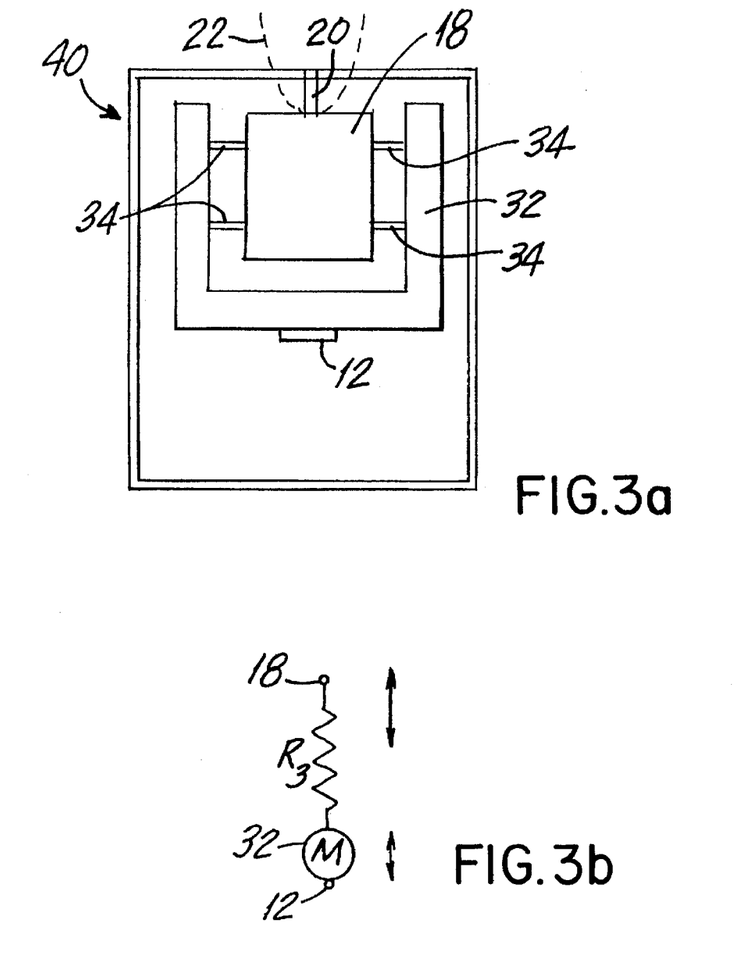

FIG. 3a is another embodiment in accordance with the invention of a vibrationally isolated thermal system 40 for a cryogenically cooled device. The functional elements are the same as in the embodiment of FIG. 2a except that the flexible, thermally conductive strap 24 is eliminated and the detector 12 is mounted directly to the isolation mass 32. This construction also eliminates any structure, such as structural elements 16, between the detector 12 and the vacuum canister 14. Because the major reduction in vibration transmission in the embodiment of FIG. 2a is provided by the isolation mass 32, elimination of the flexible strap 24 and structural elements 16 does not significantly affect the required dimensions of the isolation mass 32. Thus, for most applications, the embodiment of FIG. 3a is preferred to the embodiment of FIG. 2a. The equivalent representation of the system 40 (FIG. 3a) is provided.

It should be understood that the detector may be an integral part of the isolation mass 32 and the detector 12, or any cooled device, may be mounted in a cavity or enclosed space within the isolation mass.

The interface mass must be thermally highly conductive; oxygen free, high conductivity copper is effective. Where there are space limitations, lead (Pb) masses may be attached (not shown) to the isolation mass 32 as lead is more dense than copper and thereby gives more mass per unit volume of the device. With increased mass comes a lower natural frequency of the mass/strap system and greater vibration reduction.

Figure 4:
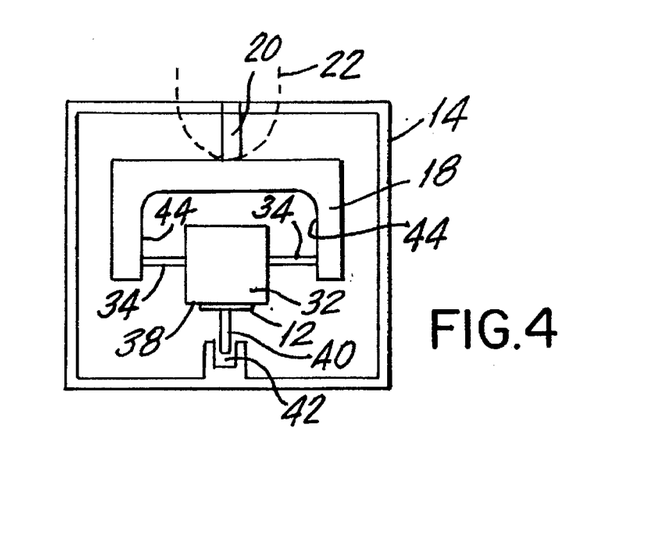
FIG. 4 is a schematic representation of another alternative embodiment of a vibrationally isolated thermal system in accordance with the invention.

FIG. 4 illustrates an alternative embodiment in accordance with the invention, wherein the cold head 18 partially surrounds the isolation mass 32. Opposed straps 34 suspend the isolation mass 32 from lateral surfaces 44 of the cold head 18. The equivalent vibrational representation of FIG. 3b is also applicable to FIG. 4. The detector 12, mounted on the surface 38 of the isolation mass 32, may alternatively be separated from the mass 32 by a strap 24 and support elements 16, as in FIGS. 2a, b.

In FIG. 4, a finger 40 of thermally insulating material extends into a receptacle 42 provided on the inner wall of the canister 14. Thus undesirable radial excursions of the detector 12, if any, are mechanically limited. In all embodiments opposed threads (not shown) of insulating material such as nylon and polyaramid fibers may be extended between the isolation mass and the canister to limit radial motion.

Figure 5:
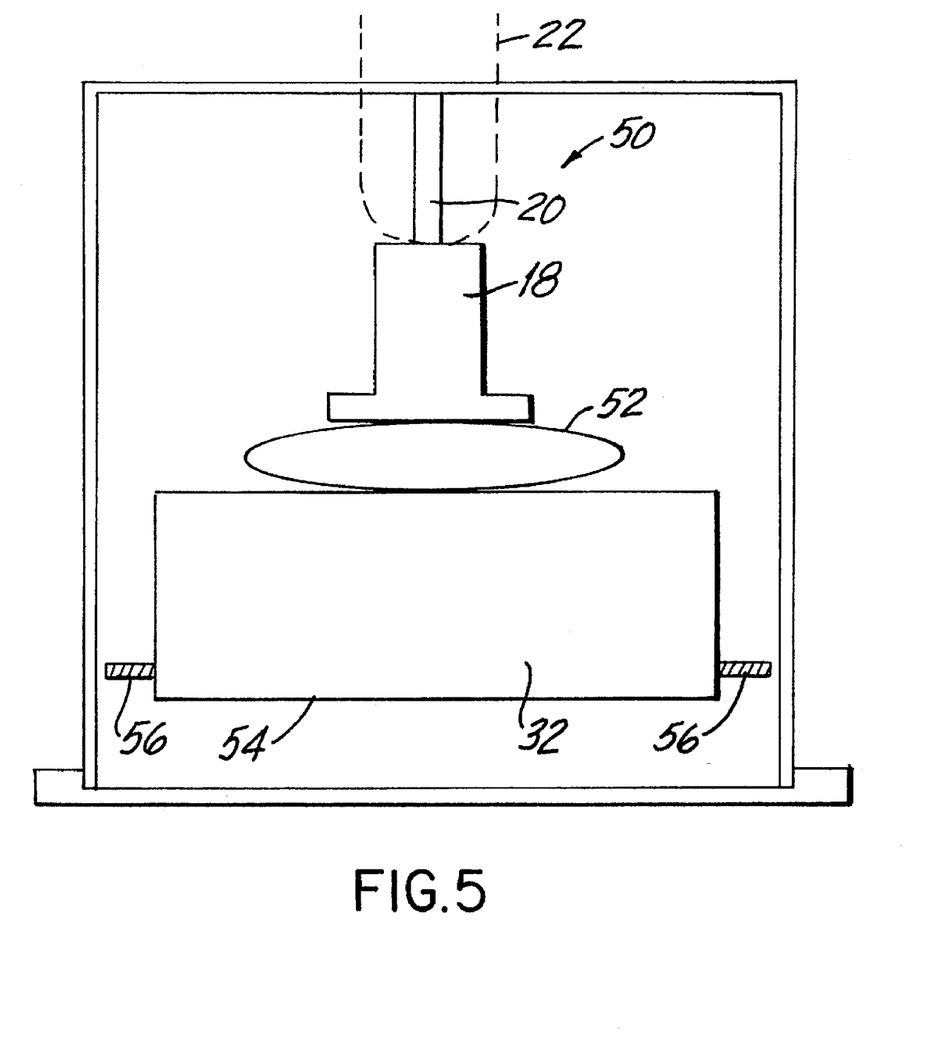
FIG. 5 is a schematic representation of yet another alternative embodiment of a vibrationally isolated thermal system in accordance with the invention.

FIG. 5 illustrates an alternative embodiment of a vibrationally isolated thermal system 50 in accordance with the invention. The isolation mass 32 is connected to the cold head 18 by a strap 52 such that the isolation mass 32 is suspended vertically below the cold head 18. A detector 12, not shown in FIG. 5, is attached either directly to the isolation mass 32 on the lower surface 54 or is connected to the mass 32 by a strap 24 and support elements 16, as shown in FIG. 2a. This system 50 is a simpler, and less expensive construction than the embodiments of FIGS. 2a and 3a. However, it cannot be operated in an inverted position, as the isolation mass 32 would come into contact with the cold station 18 and directly transmit vibrations therefrom without any reduction.

Insulator supports 56 prevent radial deflection problems and prevent the isolation mass 32 from touching the warm walls of the vacuum canister 14. The supports 56 can be eliminated. However, then the system can only be operated with the cold head pointing down, as illustrated. In any other orientation, the mass may deflect too far in a radial direction and touch the vacuum canister 14.

Supports 56, and finger 40, where used, are made of a good thermal insulating material such as glass epoxy G10. Any type of fixed radial support, which prevents the isolation mass 32 from radially deflecting into contact with the vacuum canister 14, but at the same time is flexible in the axial direction (vertically as illustrated in FIG. 5) may be helpful. A hazard exists when the canister 14 is used for support in that the canister 14 may be vibrating at higher levels than the isolation mass 32, with a resultant increase in the vibration level at the isolation mass 32. Such increased vibration would be transmitted to the detector 12 that is connected to the isolation mass 32 either directly or by means of a strap 24.

Figure 6A:
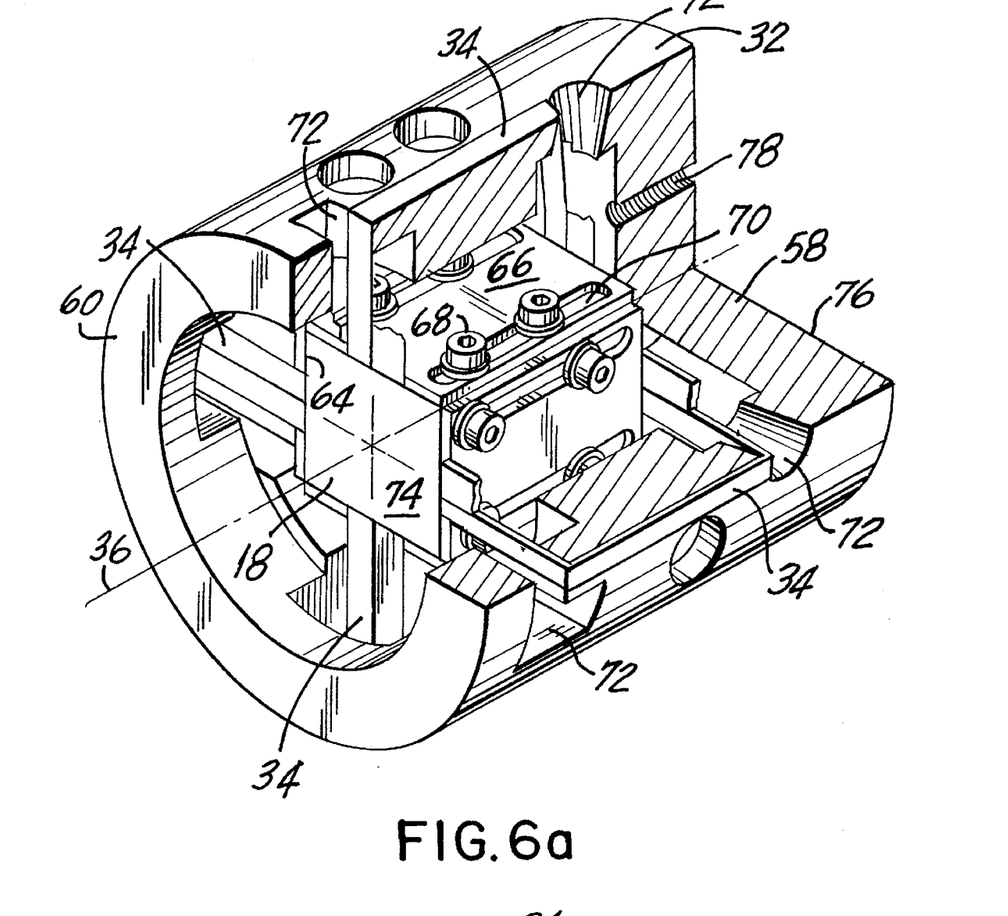
FIG. 6a is a perspective view, partially cut away, of a cold head and vibration isolation mass in accordance with the invention.
Figure 6B:
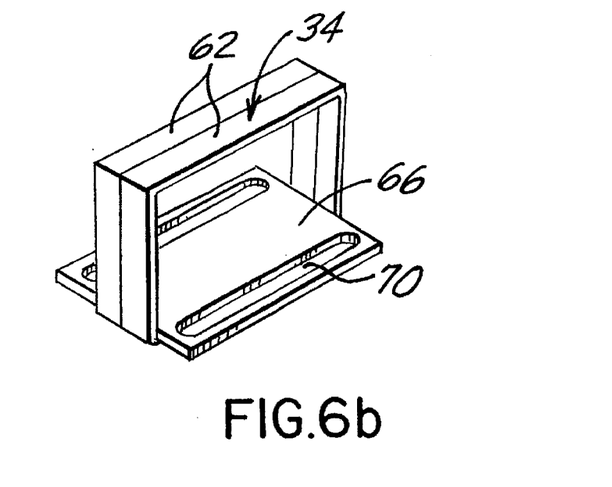

FIGS. 6a, 6b illustrate an exemplary construction of a cold head/strap/isolation mass assembly corresponding to the constructions of FIGS. 2a and 3a. The cold head 18 is a generally rectangular solid block of highly conductive material, for example, copper, which is oriented along a longitudinal axis 36. The isolation mass 32 is a generally cylindrical sleeve that is closed at one end 58 and open at the other end 60. The cylindrical axis of the mass 32 also corresponds to the axis 36. There is no direct contact between the cold head 18 and the isolation mass 32 and the isolation mass is also made of a highly conductive material, for example, copper.

The cold head 18 is held in its position, within the hollow space of the isolation mass 32 by means of four straps 34 that are made of flat, highly flexible, highly thermally conductive braided copper. Each strap 34 is comprised (FIG. 6b) of two braided bands 62 and each strap is formed into a loop that is oriented generally parallel to the longitudinal axis 36. Each strap 34 is held to a respective planar face 64 of the rectangular cold head 18 by a respective plate 66, which in turn is attached to the cold head 18 by means of bolts 68 that pass through slots 70 in the plates 66 and engage in threaded holes (not visible in the drawings) in the cold head 18.

The strap 34 passes underneath the plate 66 so as to form a complete loop. The strap may be soldered to the plate 66 to provide a better thermal bond. The outer portion of the loop that does not engage the plate 66 passes through openings 72 provided in the isolation mass 32 such that the cold head 18 may be said to be suspended symmetrically within the isolation mass 32, or more accurately, the isolation mass 32 is suspended from the cold head 18. Because of the highly flexible braided construction of the straps 34, they bend to conform to corners, etc. such that the rectangular shape of the strap, as best shown in FIG. 6b, is obtainable.

As configured, the support system is fairly stiff in the radial direction but is flexible in the axial direction (36). The center of gravity of the isolation mass 32 falls inside the volume bounded by the upper and lower copper straps. This construction results in stable support of the isolation mass 32 so that the mass does not deflect sideways into the warmer vacuum canister 14 or touch the cold head 18, if the assembly is run on its side, as illustrated. Operation is independent of orientation of the axis 36.

Portions of the isolation mass 32 may be made of lead if greater weight is required within a given dimensional constraint.

An isolation mass 32, cold head 18 and straps 34 were constructed such that the isolation system had a fundamental frequency below 20 Hz. The copper straps 34 were sized such that they provided adequate heat transfer area, while at the same time were flexible enough to maintain the natural frequency below 20 Hz. A temperature rise between the cold head 18 and detector interface 76 of less than 2.5 K per watt of heat transferred, was verified experimentally. A reduction in vibration forces in the range of 10 to 1 to 25 to 1 was achieved with the system that resonated naturally below 20 Hz.

In use, a structural element 20, to hold the cold head 18 in position in a canister 14, attaches, for example, to the cold head 18 at the surface 74. This attachment (not shown) may also be made using the same bolts 68 that hold the plates 66 to the cold head 18.

The cold end of a refrigeration unit 22 may also connect to the surface 74 of the cold head 18 such that all thermal energy from a detector 12 leaves the system through the surface 74, or the cold head 18 may be an integral part of the refrigeration unit 22.

The outer surface 76 at the closed end 58 of the isolation mass 32 provides an interface where a detector 12 (not shown) may be attached directly, using a threaded fastener (not shown) that engages the threaded hole 78. Alternatively, the detector may be connected to the interface surface 76 by means of an intermediate strap 24 as shown in the diagram of FIG. 2a.

Although the cold head 18 illustrated in FIG. 6a is a rectangular block, it should be understood that different shapes may be used. For example, a cross section of the cold head, taken transversely to the axis 36, may be round, pentagonal, hexagonal, elongated rectangular, triangular, etc., etc. There may be an opening in or through the cold head wherein a cold portion of a refrigeration unit 22 is inserted. The isolation mass 32 need not be circular in general cross section and also may be rectangular, five-sided, etc., etc. The cold head 18 may extend out of the opening at the end 60, and the outer wall of the mass may have cutouts to allow access to the cold head.

The number of straps need not be four. A pair of generally opposed straps 34 may be sufficient in some applications for suspending the isolation mass 32. In such a situation, the vibration forces will differ along the three axes. Also, parallel sets of straps (not shown) may be used. Three straps oriented at 120° may be used, and a single strap may be used, for example in FIGS. 6a, b, if the axis 36 is to be oriented horizontally.

If, for example, the cold head 18 is octagonal in cross section, eight straps may be used. Basically, the strap areas and quantity must be factored into calculations of any design giving regard to both the thermal characteristics and vibrational characteristics of the entire assembly, as discussed above. It is possible to "tune" an apparatus thermally and/or vibrationally by selecting the sizes and quantities of straps that are actually used. For example, a cold head/strap/mass assembly that physically can accommodate eight straps may be operated, as suits the installation, with any of one to eight straps. The resonant frequency, vibration transmission, and heat transfer change incrementally with the addition or removal of each strap.

Using a construction as illustrated in FIGS. 6a, b, it has been possible to replace an open cycle nitrogen boiling system with a closed cycle vapor compression unit and maintain vibration of the cooled device within desired limits.

It has been found that with isolation masses having a weight in a range of approximately 0.02 to 10 kilograms, it is possible to effect vibration reduction by a factor in a range of approximately 2 to 200. A reduction in transmission of vibrational forces has been effected for all disturbances having a driving frequency in excess of 3 Hz. Also, the straps 34 permitted a thermal conductance (watts/K) from the cold head 18 to the interface on the isolation mass 32 where the strap 24 or detector 12 is connected, to be in a range of 0.02 to 2. Thus, many of the cooling units now available on the market for the required cryogenic temperatures and loads, can benefit from the isolation provided in accordance with the invention.

It will thus be seen that the objects set forth above, and those made apparent from the preceding description, are efficiently attained and, since certain changes may be made in the above constructions without departing from the spirit or the scope of the invention, it is intended that all matter contained in the above description, or shown in the accompanying drawings shall be interpreted as illustrative and not in a limiting sense.

What is claimed is:

1. A vibrationally isolated thermal system for a cryogenically cooled device, said system comprising:

a cold head, said cold head being maintainable at a selected cryogenic temperature by connecting refrigeration means thereto, said cold head having a longitudinal axis, and first and second axial ends, a portion of said cold head proximate said first axial end being adapted for connecting to said refrigeration means;

isolation mass means spaced from said cold head and having an interface surface for one of connection directly to said cooled device and connection indirectly to said cooled device;

at least one flexible and thermally conductive strap having a first end and a second end, said first end being connected to said cold head, said second end being connected to said isolation mass, said isolation mass being suspended from said cold head by said at least one strap.

2. A vibrationally isolated thermal system as in claim 1, wherein said at least one strap is of braided metal.

3. A vibrationally isolated thermal system as in claim 2, wherein said braided metal is copper.

4. A vibrationally isolated thermal system as in claim 1, wherein said at least one strap suspends said isolation mass with more rigidly against radial motion relative to said axis than against axial motion.

5. A vibrationally isolated thermal system as in claim 1, wherein said interface surface on said isolation mass is generally along said longitudinal axis.

6. A vibrationally isolated thermal system as in claim 1, wherein said cooled device is connected indirectly to said isolation mass by a braided thermally conductive strap, a cooled device being constrained in said canister by support means extending between said device and said canister.

7. A vibrationally isolated thermal system for a cryogenically cooled device, said system comprising:
  a cold head, said cold head being maintainable at a selected cryogenic temperature by connecting refrigeration means thereto, said cold head having a longitudinal axis, and first and second axial ends, a portion of said cold head proximate said first axial end being adapted for connecting to said refrigeration means;
  isolation mass means spaced from said cold head and having an interface surface for one of connection directly to said cooled device and connection indirectly to said cooled device, said isolation mass partially surrounding said cold head, at least said first axial end of said cold head being exposed and accessible for connection to said refrigeration means;
  at least one flexible and thermally conductive strap having a first end and a second end, said first end being connected to said cold head, said second end being connected to said isolation mass, said isolation mass being suspended from said cold head by said at least one strap.

8. A vibrationally isolated thermal system as in claim 7, wherein said cold head has at least one lateral surface, said at least one strap connecting at said first end of said at least one strap to said at least one lateral surface of said cold head.

9. A vibrationally isolated thermal system as in claim 7, wherein a fundamental resonant frequency of said isolation mass and said at least one strap in combination is less than 60 Hz.

10. A vibrationally isolated thermal system as in claim 7, wherein the number of said straps is at least two, said straps being generally opposed to each other in connection between said cold head and said isolation mass, said thermal system being operable at any orientation of said axis.

11. A vibrationally isolated thermal system as in claim 10, wherein said isolation mass is generally tubular.

12. A vibrationally isolated thermal system as in claim 11, wherein said generally tubular isolation mass is closed proximate said second axial end of said cold head.

13. A vibrationally isolated thermal system as in claim 11, wherein said cold head and said isolation mass are generally coaxial.

14. A vibrationally isolated thermal system as in claim 7, wherein said at least one strap is held to said cold head by at least one respective plate contoured to attach to at least one cold head lateral surface, said strap being sandwiched between said plate and said cold head surface for effective heat transfer.

15. A vibrationally isolated thermal system as in claim 7, wherein the quantity of said straps is any number from 1 to N, whereby performance characteristics of said thermal system are tunable by selection of the number and construction of said straps.

16. A vibrationally isolated thermal system as in claim 15, wherein said cold head has N lateral surfaces for connection of said number of straps thereto at said first ends of said straps.

17. A vibrationally isolated thermal system for a cryogenically cooled device, said system comprising:
  a cold head, said cold head being maintainable at a selected cryogenic temperature by connecting refrigeration means thereto, said cold head having a longitudinal axis, first and second axial ends, a portion of said cold head proximate said first axial end being adapted for connecting to said refrigeration means;
  isolation mass means spaced from said cold head and having an interface surface for one of connection directly to said cooled device and connection indirectly to said cooled device;
  at least one flexible and thermally conductive strap having a first end and a second end, said first end being connected to said cold head, said second end being connected to said isolation mass, said isolation mass being suspended from said cold head by said at least one strap; and
  lateral support extending from said isolation mass transversely to said longitudinal axis of said cold head, said lateral support being highly thermally insulating.

18. A vibrationally isolated thermal system for a cryogenically cooled device, said system comprising:
  a cold head, said cold head being maintainable at a selected cryogenic temperature by connecting refrigeration means thereto, said cold head having a longitudinal axis, and first and second axial ends, a portion of said cold head proximate said first axial end being adapted for connecting to said refrigeration means;
  isolation mass means spaced from said cold head and having an interface surface for one of connection directly to said cooled device and connection indirectly to said cooled device;
  at least one flexible and thermally conductive strap having a first end and a second end, said first end being connected to said cold head, said second end being connected to said isolation mass, said isolation mass being suspended from said cold head by said at least one strap,
  wherein a fundamental resonant frequency of said isolation mass and said at least one strap in combination is less than 60 Hz.

19. A vibrationally isolated thermal system for a cryogenically cooled device, said system comprising:
  a cold head, said cold head being maintainable at a selected cryogenic temperature by connecting refrigeration means thereto, said cold head having a longitudinal axis, and first and second axial ends, a portion of said cold head proximate said first axial end being adapted for connecting to said refrigeration means;
  isolation mass means spaced from said cold head and having an interface surface for one of connection directly to said cooled device and connection indirectly to said cooled device;
  at least one flexible and thermally conductive strap having a first end and a second end, said first end being connected to said cold head, said second end being connected to said isolation mass, said isolation mass being suspended from said cold head by said at least one strap, said cold head partially surrounding said isolation mass, at least said first axial end of said cold head being exposed and accessible for connection to said refrigeration means.

20. A vibrationally isolated thermal system as in claim 19, wherein said cold head has at least one lateral surface, said at least one strap connecting at said first end of said at least one strap to said at least one lateral surface of said cold head.

21. A vibrationally isolated thermal system as in claim 19, wherein a fundamental resonant frequency of said isolation mass and said at least one strap in combination is less than 60 Hz.

22. A vibrationally isolated thermal system as in claim 19, wherein the number of said straps is at least two, said straps being generally opposed to each other in connection between said cold head and said isolation mass, said thermal system being operable at any orientation of said axis.

23. A vibrationally isolated thermal system as in claim 19, wherein the quantity of said straps is any number from 1 to N, whereby performance characteristics of said thermal system are tunable by selection of the number and construction of said straps.

24. A vibrationally isolated thermal system as in claim 19, wherein said cold head and said isolation mass are generally coaxial.

* * * * *